United States Patent
Ma et al.

(10) Patent No.: US 10,155,615 B2
(45) Date of Patent: Dec. 18, 2018

(54) SEAL BAR AND PROCESS FOR USING SAME

(71) Applicant: Dow Global Technologies LLC, Midland, MI (US)

(72) Inventors: Liangkai Ma, Midland, MI (US); Sam L. Crabtree, Midland, MI (US); Jorge Caminero Gomes, Sao Paulo (BR); Mark H. Mirgon, Midland, MI (US); Marc S. Black, Midland, MI (US); Mark O. Labonville, Midland, MI (US); Matthew J. Turpin, Midland, MI (US); Matthew J. Heath, Sanford, MI (US); Cory M. Saylor, Sanford, MI (US); Leigh Anne A. VanSumeren, Midland, MI (US); Nicolas Cardoso Mazzola, Jundiai (BR)

(*) Notice: Subject to any disclaimer, the term of this patent is extended or adjusted under 35 U.S.C. 154(b) by 235 days.

(21) Appl. No.: 15/276,014

(22) Filed: Sep. 26, 2016

(65) Prior Publication Data
US 2018/0086528 A1  Mar. 29, 2018

(51) Int. Cl.
*B65D 75/58* (2006.01)
*B65B 61/20* (2006.01)
(Continued)

(52) U.S. Cl.
CPC .......... *B65D 75/5883* (2013.01); *B29C 65/18* (2013.01); *B29C 66/1122* (2013.01);
(Continued)

(58) Field of Classification Search
CPC ............ B65D 75/5866; B65D 75/5883; B65B 61/186; B29C 66/53262; B29C 66/53263;
(Continued)

(56) References Cited

U.S. PATENT DOCUMENTS

| 4,555,293 A | 11/1985 | French |
| 5,087,235 A | 2/1992 | Lafleur |

(Continued)

FOREIGN PATENT DOCUMENTS

| AU | 46847 A | 3/1986 |
| AU | 2012212402 B2 | 6/2016 |

(Continued)

OTHER PUBLICATIONS

Potemkin, Physical Review E (1998) 57(6) pp. 6902-6912.
Dobrynin, J. Chem. Phys. (1997), 107(21), pp. 9234-9238.

*Primary Examiner* — Carson Gross
(74) *Attorney, Agent, or Firm* — Husch Blackwell LLP

(57) ABSTRACT

The present disclosure provides a seal bar. In an embodiment, the seal bar comprises a base member having a flat front surface and a flat recessed surface a distance (d) behind the front surface. The front surface defines an x-axis, X. The flat recessed surface has a first endpoint (A1), wherein an axis that is perpendicular to the flat recessed surface at the first endpoint (A1) defines a first y-axis (Y1). The seal bar has a concave surface extending the distance (d) between the first endpoint (A1) and a point (B1) on the flat front surface. The concave surface defines a quadrant arc segment of an ellipse between the first endpoint (A1) and the point (B1).

8 Claims, 5 Drawing Sheets

(51) Int. Cl.
*B29C 65/18* (2006.01)
*B29C 65/00* (2006.01)
B65B 61/18 (2006.01)
B29C 65/08 (2006.01)
B29C 65/72 (2006.01)
B29C 65/04 (2006.01)

(52) U.S. Cl.
CPC ........ *B29C 66/53262* (2013.01); *B29C 66/71* (2013.01); *B29C 66/73921* (2013.01); *B29C 66/81431* (2013.01); *B29C 66/83221* (2013.01); *B65B 61/20* (2013.01); *B29C 65/04* (2013.01); *B29C 65/08* (2013.01); *B29C 65/72* (2013.01); *B29C 66/81423* (2013.01); *B65B 61/186* (2013.01)

(58) Field of Classification Search
CPC ........ B29C 66/83221; B29C 66/81423; B29C 65/04; B29C 65/08; B29C 65/18; B29C 65/72
See application file for complete search history.

(56) References Cited

U.S. PATENT DOCUMENTS

| | | | |
|---|---|---|---|
| 5,203,819 A | 4/1993 | Gleason | |
| 5,324,233 A * | 6/1994 | Owensby | B29C 65/18 493/190 |
| 5,417,035 A | 5/1995 | English | |
| 5,437,595 A | 8/1995 | Smith | |
| 5,484,375 A | 1/1996 | Owensby et al. | |
| 5,505,040 A | 4/1996 | Janssen et al. | |
| 5,561,966 A | 10/1996 | English | |
| 5,783,638 A | 7/1998 | Lai et al. | |
| 5,976,300 A * | 11/1999 | Buchanan | A61J 1/10 156/273.7 |
| 6,729,109 B2 | 5/2004 | Knoerzer et al. | |
| 7,608,668 B2 | 10/2009 | LiPiShan et al. | |
| 7,736,288 B2 | 6/2010 | Mizuo et al. | |
| 7,858,706 B2 | 12/2010 | Arriola et al. | |
| 7,908,826 B2 | 3/2011 | Reaves et al. | |
| 7,864,829 B2 | 6/2011 | Vess | |
| 8,075,189 B2 | 12/2011 | Berman | |
| 8,362,396 B2 | 1/2013 | Vess | |
| 8,672,182 B2 | 3/2014 | Bonet | |
| 8,734,015 B2 | 5/2014 | Futase | |
| 8,950,618 B2 | 2/2015 | Degutis et al. | |
| 9,132,944 B2 | 9/2015 | Schick | |
| 2004/0161174 A1 | 8/2004 | Bartel et al. | |
| 2009/0196537 A1 | 8/2009 | Aikawa et al. | |
| 2010/0119783 A1 | 5/2010 | Futase | |
| 2011/0062192 A1 | 3/2011 | Gruber | |
| 2011/0110613 A1 | 5/2011 | Futase | |
| 2012/0005993 A1 | 1/2012 | Doll | |
| 2013/0315508 A1 | 11/2013 | Futase | |
| 2014/0217119 A1 | 8/2014 | Futase | |
| 2015/0175323 A1 | 6/2015 | Barron | |
| 2017/0120552 A1 * | 5/2017 | Franca | B29C 66/1122 |
| 2017/0121083 A1 | 5/2017 | Hishihuma | |

FOREIGN PATENT DOCUMENTS

| | | |
|---|---|---|
| CA | 2239006 C | 3/2006 |
| CN | 103016890 A | 4/2013 |
| CN | 203318776 U | 12/2013 |
| CN | 203997078 U | 12/2014 |
| DE | 29522009 U1 | 6/1999 |
| DE | 102009042983 A1 | 3/2011 |
| EP | 820854 B1 | 5/2001 |
| EP | 2366531 B1 | 9/2015 |
| JP | H071587 A | 1/1995 |
| JP | H11124144 A | 5/1999 |
| JP | 2001018954 A | 1/2001 |
| JP | 2005298038 A | 10/2005 |
| JP | 2007159804 A | 6/2007 |
| JP | 4392198 B2 | 12/2009 |
| JP | 2010095272 A | 4/2010 |
| JP | 4466154 B2 | 5/2010 |
| JP | 4712085 B2 | 6/2011 |
| JP | 2011240932 A | 12/2011 |
| JP | 5360573 B2 | 12/2013 |
| JP | 5459639 B2 | 4/2014 |
| JP | 5227450 B2 | 7/2014 |
| JP | 2015071455 A | 4/2015 |
| WO | 2007067029 A1 | 6/2007 |
| WO | 2009087454 A1 | 7/2009 |
| WO | 2010058052 A1 | 5/2010 |

* cited by examiner

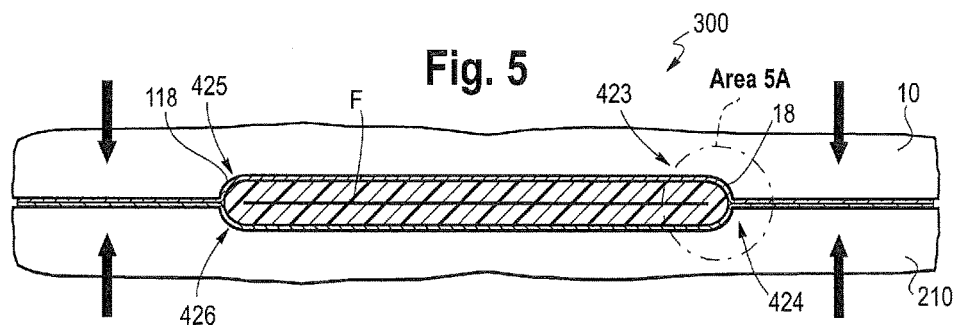
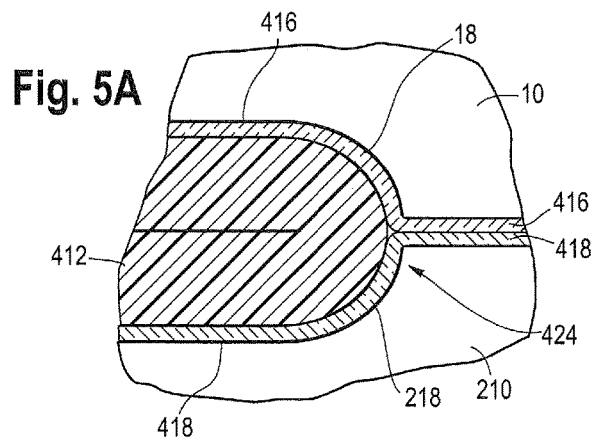
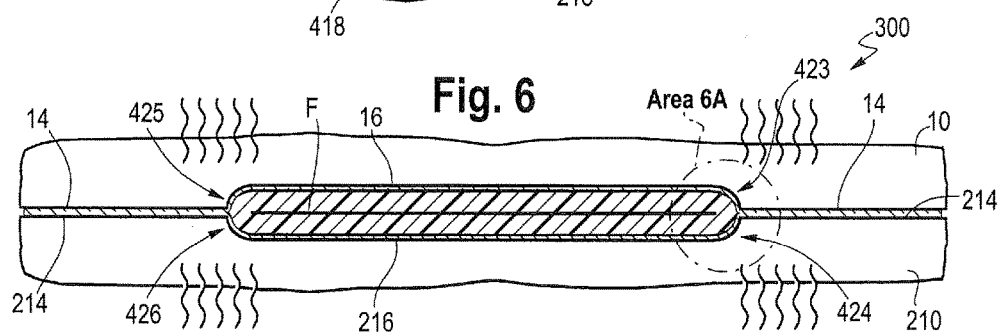
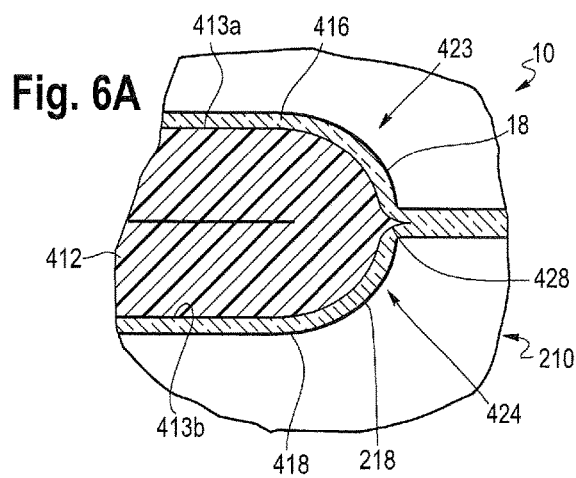

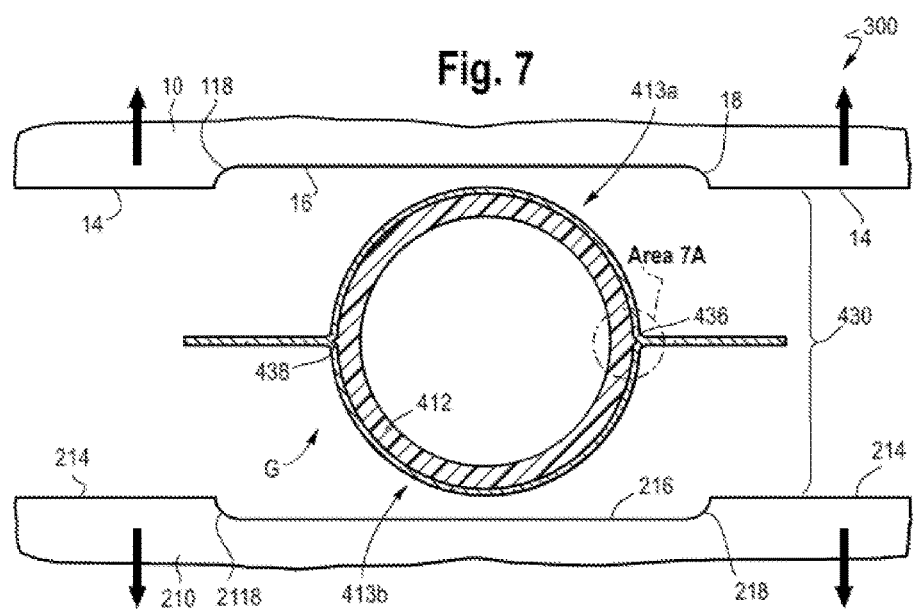
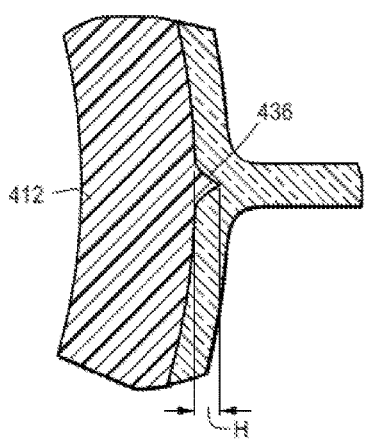

SEAL BAR AND PROCESS FOR USING SAME

The present disclosure is directed to a seal bar, a seal bar apparatus, and a process for sealing a flexible fitment between two flexible films.

Known are flexible pouches with rigid pour spouts for storage and delivery of flowable materials, often referred to as "pour-pouches." Many conventional pour-pouches utilize a rigid pour spout, with the base of the spout having winglets. Each winglet is a structure that is perpendicular to the base, each winglet extends radially away (in opposing directions) from the annular base of the spout. Winglets are used to increase the surface area of the annular base in order to promote adhesion between the spout and flexible packaging film.

Winglets, however, are problematic because they require a specialized heat seal bar to effectively seal the winglet to flexible film packaging. The specialized heat seal bar requires a unique shape that mates with the shape of the spout base and winglet. In addition, the heat seal process requires precise and mated alignment between the spout and the films to ensure the spout is in parallel alignment with the film orientation.

As such, the production of flexible pouches is replete with inefficiency due to (1) the expense of specialized heat seal equipment, (2) the production down-time for precise seal bar-winglet alignment, (3) the production down-time required for precise spout-film alignment, (4) the failure rate (leaks) due to misalignment, and (5) the quality control steps required at each stage of pour-pouch production.

The art recognizes the need for alternative equipment and processes in the production of pour-pouches. The art further recognizes the need for improved pour spouts that avoid the production drawbacks of spouts having winglets.

SUMMARY

The present disclosure provides a seal bar, a seal bar apparatus and a process for sealing a fitment to a pour-pouch. The present fitment reduces the amount of materials used to produce the fitment itself and also simplifies the pour-pouch production process.

The present disclosure provides a seal bar. In an embodiment, the seal bar comprises a base member having a flat front surface and a flat recessed surface a distance (d) behind the front surface. The front surface defines an x-axis, X. The flat recessed surface has a first endpoint (A1), wherein an axis that is perpendicular to the flat recessed surface at the first endpoint (A1) defines a first y-axis (Y1). The seal bar has a concave surface extending the distance (d) between the first endpoint (A1) and a point (B1) on the flat front surface. The concave surface defines a quadrant arc segment of an ellipse between the first endpoint (A1) and the point (B1).

The present disclosure provides a seal bar apparatus. In an embodiment, the seal bar apparatus includes a first seal bar and a second seal bar. Each seal bar is the same, and has the structure and geometry of the seal bar disclosed above. The first seal bar and the second seal bar oppose each other. The flat front surface of the first seal bar faces the flat front surface of the second seal bar.

The present disclosure provides a process. In an embodiment, the process includes (A) providing the seal bar apparatus disclosed above. The process includes (B) providing a fitment with a base. The base comprises an ethylene/α-olefin multi-block copolymer. The process includes (C) placing the base between two opposing multilayer films. Each multilayer film has a respective seal layer comprising an olefin-based polymer. The placing step forms a film/base/film sandwich. The process includes (D) positioning the film/base/film sandwich between the opposing first seal bar and the second seal bar of the seal bar apparatus. The process includes (E) sealing the base to each multilayer film with the opposing heated seal bars.

An advantage of the present disclosure is a seal bar, or a pair of seal bars, for improved single stage heat sealing a fitment to flexible films.

An advantage of the present disclosure is a pair of seal bars embodying a unique elliptical arc geometry.

An advantage of the present disclosure is a pour-pouch production process that requires less time (greater efficiency) and fewer failures (higher productivity) compared to pour-pouch production processes utilizing spouts with winglets.

An advantage of the present disclosure is a flexible fitment with resiliency to spring back to an open position after full collapse during heat seal, the fitment made from ethylene/α-olefin multi-block copolymer that is compatible with seal layer polyolefins.

BRIEF DESCRIPTION OF THE DRAWINGS

FIG. 5 is an elevation view of a heat sealing procedure wherein the film/base/film sandwich is disposed between opposing seal bars that are in a fully closed position, in accordance with an embodiment of the present disclosure.

FIG. 5A is an enlarged elevation view of Area 5A of FIG. 5.

FIG. 6 is an elevation view of the seal bars in the fully closed position and heat being applied to the film/base/film sandwich, in accordance with an embodiment of the present disclosure.

FIG. 6A is an enlarged elevation view of Area 6A of FIG. 6 showing formation of a seal and an in situ winglet, in accordance with an embodiment of the present disclosure.

FIG. 7 is an elevation view of a heat sealing procedure wherein the seal bars are in an open position after the films are sealed to the fitment, in accordance with an embodiment of the present disclosure.

FIG. 7A is an enlarged elevation view of Area 7A of FIG. 7 showing the formation of an in situ winglet, in accordance with an embodiment of the present disclosure.

DEFINITIONS

Figure 1:
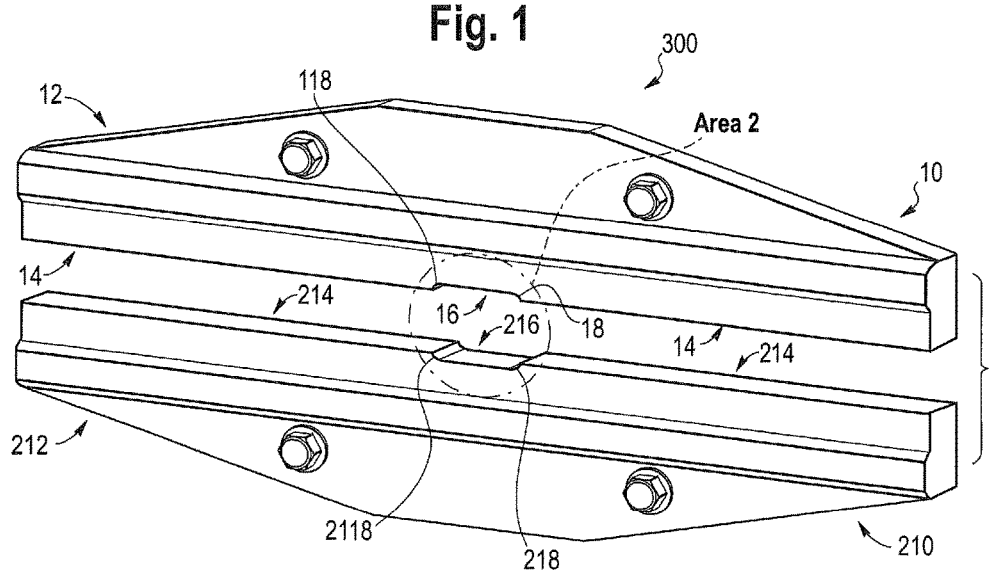
FIG. 1 is a perspective view of opposing seal bars in accordance with an embodiment of the present disclosure.

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Density is measured in accordance with ASTM D 792 with values reported in grams per cubic centimeter, g/cc.

Elastic recovery is measured as follows. Stress-strain behavior in uniaxial tension is measured using an Instron™ universal testing machine at 300% min$^{-1}$ deformation rate at 21° C. The 300% elastic recovery is determined from a loading followed by unloading cycle to 300% strain, using ASTM D 1708 microtensile specimens. Percent recovery for all experiments is calculated after the unloading cycle using the strain at which the load returned to the base line. The percent recovery is defined as:

% Recovery=100*(*Ef*−*Es*)/*Ef* where Ef is the strain taken for cyclic loading and Es is the strain where the load returns to the baseline after the unloading cycle.

An "ethylene-based polymer," as used herein is a polymer that contains more than 50 mole percent polymerized ethylene monomer (based on the total amount of polymerizable monomers) and, optionally, may contain at least one comonomer.

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Shore A hardness is measured in accordance with ASTM D 2240.

Tm or "melting point" as used herein (also referred to as a melting peak in reference to the shape of the plotted DSC curve) is typically measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

DETAILED DESCRIPTION

The present disclosure provides a seal bar. The seal bar includes a base member having a flat front surface, a flat recessed surface, and a concave surface extending between the flat front surface and the flat recessed surface. The flat recessed surface is located a distance (d) behind the flat front surface. The flat front surface defines an x-axis, X. The recessed surface has a first endpoint (A1). An axis that is perpendicular to the flat recessed surface at the first endpoint (A1) defines a first y-axis (Y1). The concave surface extends the distance (d) between a point (B1) on the flat front surface and the first endpoint (A1) on the flat recessed surface. The concave surface defines a quadrant arc segment of an ellipse between the first endpoint (A1) and the point (B1).

1. Seal Bar

Referring to the drawings, and initially to FIG. 1, a seal bar 10 and a seal bar 210 are shown. A "seal bar," as used herein, is a component of a seal bar apparatus. A seal bar is one member in a pair of rigid and elongated members made of a thermally conductive material (typically a metal) used in a heat sealing operation. The term "heat sealing," or "heat sealing operation," as used herein, is the act of placing two or more films of polymeric material (and optional fitment or tubing) between two opposing seal bars. The seal bars are moved toward each other, sandwiching the films, to apply heat and pressure to the films such that opposing interior surfaces (seal layers) of the films contact, melt, and form a heat seal, or form a weld, to attach the films to each other. A "seal bar apparatus," as used herein, includes suitable structure, mechanism, and control (i) to heat the seal bars and control the temperature of the seal bars, (ii) to move the seal bars toward and away from each other between an open position and a closed position, and (iii) to apply a sealing pressure and control the sealing pressure in order to melt and weld the films to each other.

In an embodiment, heat sealing includes radio frequency sealing, ultrasonic welding, and combinations thereof.

FIG. 1 shows a seal bar apparatus 300 with a first seal bar 10 and a second seal bar 210. The first seal bar 10 and/or the second seal bar 210 each may be individually referred to as a "seal bar," or collectively as "seal bars." Seal bar 10 opposes seal bar 210 as shown in FIG. 1. The seal bar 10 and the seal bar 210 are the same, or substantially the same, with the seal bar 210 oriented in in mirror-image arrangement in order to perform a heat sealing operation.

It is understood that seal bar 210 has the same components as the seal bar 10, with the description of seal bar 10 applying equally to seal bar 210. The reference numerals for the seal bar 210 are the same as the reference numerals for the components of the seal bar 10, with the understanding that the components for the seal bar 210 will begin with the numeral "2." For example, seal bar 210 is a second seal bar with the same structure and geometry as seal bar 10, seal bar 210 disposed in mirror image relation with respect to seal bar 10. The seal bar 210 has the same structure as seal bar 10 and the first digit "2" in the reference numeral for seal bar "210" designating the "second" seal bar 210.

Figure 2:
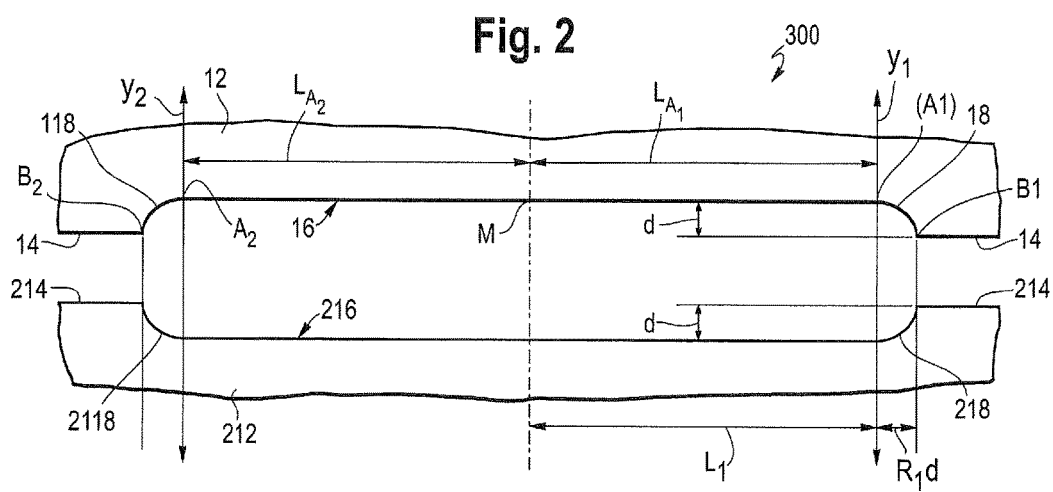
FIG. 2 is an enlarged front elevation view of Area 2 of FIG. 1.
Figure 3:
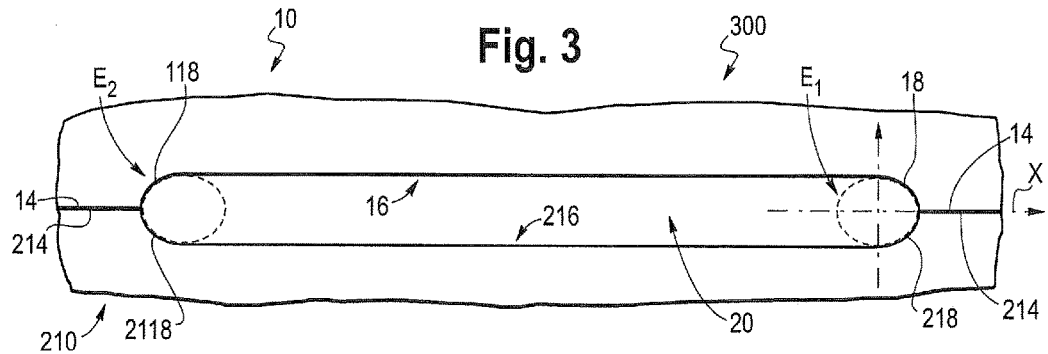
FIG. 3 is a front elevation view of Area 2 of FIG. 1 with Cartesian coordinates superimposed thereon.
Figure 3A:
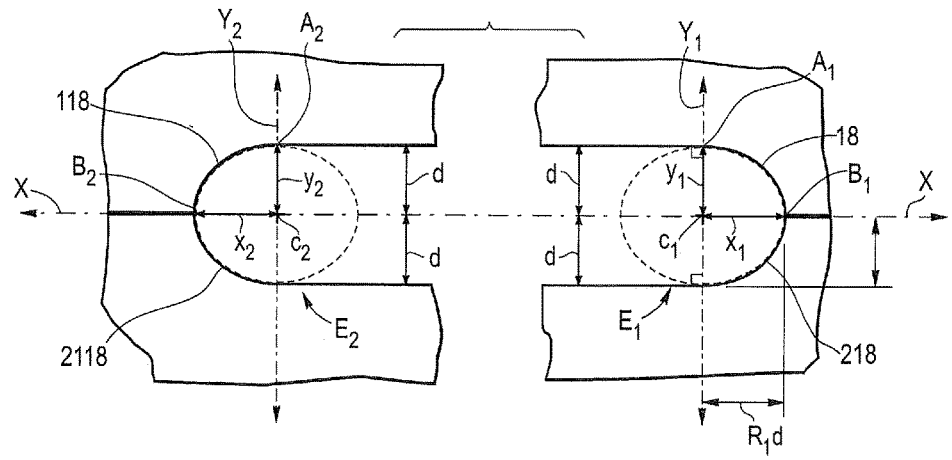
FIG. 3A is an enlarged fragmented view of FIG. 3 showing concave surfaces of the seal bars with Cartesian coordinates superimposed thereon, in accordance with an embodiment of the present disclosure.

The seal bar 10 includes a base member 12 having a flat front surface 14 and a flat recessed surface 16. For clarity, the first seal bar has a base member 12 having a flat front surface 14. Correspondingly, the second seal bar 210 has a base member 212 with a flat front surface 214. The flat recessed surface 16 is located a distance (d) behind the flat front surface. The flat recessed surface 16 has opposing endpoints, depicted as a first endpoint (A1) and a second endpoint (A2) as shown in FIGS. 2, 3, 3A. The endpoints (A1), (A2) identify where the flat recessed surface ends and a concave surface 18 begins. In FIG. 2, the distance from the midpoint M of the flat recessed surface 16 to the first endpoint (A1) is shown as Line $L_{A1}$. The distance from the midpoint M to the second endpoint (A2) is shown as Line $L_{A2}$. In an embodiment, Line $L_{A1}$ and Line $L_{A2}$ each has a length from 7.0 mm, or 7.5 mm, or 8.0 mm, or 8.2 mm, or 8.4 mm to 8.6 mm, or 9.0 mm, or 9.5 mm, or 10.0 mm.

In an embodiment, the distance between (A1) and (A2) is from 14.0 mm, or 15.0 mm, or 16.0 mm, or 16.4 mm, or 16.8 mm to 17.2 mm, or 18.0 mm, or 19.0 mm or 20.0 mm.

In an embodiment, the seal bars are tailored to the fitment and to the films used to make the flexible container. The distances of Length, $L_{A1}$+Length $L_{A2}$ is sufficient to allow closure of seal bars with the collapsed fitment and films inside and also provide contact pressure at the concave surfaces of the seal bar to the fitment and films.

The seal bar end proximate to the first endpoint (A1) will hereafter be referred to as the first seal bar end. The seal bar end proximate to the second endpoint (A2) will hereafter be referred to as the second seal bar end.

The flat front surface 14 defines an x-axis, X, as shown in FIGS. 3 and 3A.

FIGS. 2 and 3A show an axis that is perpendicular to the flat recessed surface 16 at the first endpoint (A1) defines a first y-axis (Y1). The first y-axis (Y1) is also perpendicular to the flat front surface 14 (and Y1 is perpendicular to the x-axis X). Similarly, an axis that is perpendicular to the flat recessed surface 16 at second endpoint (A2) defines a second y-axis (Y2). The second y-axis (Y2) is also perpendicular to the flat front surface 14 (and Y2 is perpendicular to the x-axis, X).

At the first end of the seal bar 10, FIGS. 2 and 3A show the concave surface 18 extends the distance (d) between the first endpoint (A1) and a point (B1) that is located on the flat front surface 14. The term "concave surface," as used herein, is a surface that curves inward, or around, a point within seal space 20. The "seal space" is the volume between seal bars 10, 210 when the seal bars 10, 210 are closed with respect to each other as shown in FIG. 3. In other words, the concave surface 18 curves inward, with respect to point C1, or around C1, as shown in FIG. 3A. Similarly, concave surface 118 curves inward with respect to point C2, or around point C2, as shown in FIG. 3A. The concave surface 18 defines a quadrant arc segment of an ellipse between the first endpoint (A1) and the point (B1).

Similarly, at the second end of the seal bar 10, FIGS. 2 and 3A show the concave surface 118 extends the distance (d) between the second endpoint (A2) and a point (B2) that is located on the flat front surface 14. The concave surface 118 defines a quadrant arc segment of an ellipse between the second endpoint (A2) and the point (B2).

The unique geometry of the present seal bar is depicted with the front elevation view of the seal bars 10, 210 as the reference, as shown in FIGS. 2, 3, and 3A in particular. FIG. 3 shows the seal bars 10, 210 in contact with each other and with respective flat front surfaces 14, 214 touching each other. Cartesian coordinates (i.e., x-axis and y-axis) are superimposed upon the front elevation views for articulating the spatial relationships and geometry of the components of the present seal bar. FIG. 3 shows that the concave surfaces of the seal bars outline, or otherwise define, a portion of two ellipses, E1 and E2 superimposed on the elevation views of the concave surfaces.

An "ellipse," as used herein, is a plane curve such that the sum of the distances of each point in its periphery from two fixed points, the foci, are equal. The ellipse has a center which is the midpoint of the line segment linking the two foci. The ellipse has a major axis (the longest diameter through the center). The minor axis is the shortest line through the center. The ellipse center is the intersection of the major axis and the minor axis. A "circle" is a specific form of ellipse, where the two focal points are in the same place (at the circle's center). The term "ellipse," as used herein, excludes the circle.

The concave surface 18 defines a quadrant arc segment of ellipse E1. FIG. 3A shows ellipse E1 which is defined by Equation (1)

$$\frac{x_1^2}{(R_1 d)^2} + \frac{y_1^2}{(d)^2} = 1,$$  Equation (1)

wherein
the center of the ellipse E1 is point (C1), the intersection of the x-axis and the first y-axis, (Y1);
$x_1$ is the ellipse semi-major axis;
$y_1$ is the ellipse semi-minor axis having the length (d); and
$R_1$ is the ratio of the semi-major axis ($x_1$) divided by the semi-minor axis ($y_1$) and $R_1$ is from 0.6 to 3.0.

In an embodiment, Equation (1) includes:

distance d from 0.3 mm, or 0.4 mm, or 0.5 mm, or 0.6 mm, or 0.7 mm, or 0.8 mm, or 0.9 mm, or 1.0 mm to 1.2 mm, or 1.5 mm, or 1.7 mm, or 1.9 mm, or 2.0 mm;

$x_1$ from 0.1 mm, or 0.5 mm, 0.8 mm, or 1.0 mm, or 1.5 mm, 1.6 mm, or 2.0 mm, or 3.0 mm, or 4.0 mm, or 5.0 mm, or 6.0 mm to 7.0 mm, or 8.0 mm, or 9.0 mm, or 10.0 mm, or 11.0 mm, or 12.0 mm; and $R_1$ from 0.6, or 0.8, or 1.0, or 1.05, or 1.09 to 1.8, or 1.9, or 2.0, or 2.5 or 3.0. In a further embodiment, $R_1$ is from greater than 1.0, or 1.1, or 1.2, or 1.3, or 1.5 to 2.0, or 2.5 or 3.0.

In an embodiment, distance d is the same as the thickness t, the wall thickness of the fitment base.

The concave surface 18 is the quadrant arc segment of the elliptical quadrant sector defined by first endpoint (A1) on the flat recessed surface, point (B1) on the flat front surface, and point (C1), the origin of ellipse E1. The concave surface 18 is the quadrant arc segment of ellipse E1 between first endpoint A1 and point B1.

In an embodiment, the distance between (B1) and (C1) is from 0.1 mm, or 0.5 mm, or 0.8 mm, or 1.0 mm, or 1.5 mm, or 1.6 mm, or 2.0 mm, or 3.0 mm, or 4.0 mm, or 5.0 mm, or 6.0 mm to 7.0 mm, or 8.0 mm, or 9.0 mm, or 10.0 mm, or 11.0 mm, or 12.0 mm. In a further embodiment, the distance between (B1) and (C1) is the same as the value for $x_1$.

On the second side of the seal bar 10, the concave surface 118 defines a quadrant arc segment of a second ellipse, ellipse E2. FIG. 3A shows ellipse E2 which is defined by Equation (2).

$$\frac{x_2^2}{(R_2 d)^2} + \frac{y_2^2}{(d)^2} = 1,$$ Equation (2)

wherein the center of the second ellipse E2 is point (C2), the intersection of the x-axis and the second y-axis, (Y2);

$x_2$ is the ellipse semi-major axis;

$y_2$ is the ellipse semi-minor axis having the length (d); and $R_2$ is the ratio of the semi-major axis ($x_2$) divided by the semi-minor axis ($y_2$), and $R_2$ is from 0.6 to 3.0.

In an embodiment, Equation (2) includes:

distance d from 0.3 mm, or 0.4 mm, or 0.5 mm, or 0.6 mm, or 0.7 mm, or 0.8 mm, or 0.9 mm, or 1.0 mm to 1.2 mm, or 1.5 mm, or 1.7 mm, or 1.9 mm, or 2.0 mm;

$x_2$ from 0.1 mm, or 0.5 mm, or 0.8 mm, or 1.0 mm, or 1.5 mm, or 1.6 mm, or 2.0 mm, or 3.0 mm, or 4.0 mm, or 5.0 mm, or 6.0 mm to 7.0 mm, or 8.0 mm, or 9.0 mm, or 10.0 mm, or 11.0 mm, or 12.0 mm; and $R_2$ is from 0.6, or 0.8, or 1.0, or 1.05, or 1.09 to 1.8, or 1.9, or 2.0, or 2.5, or 3.0. In a further embodiment, $R_2$ is from greater than 1.0, or 1.1, or 1.2, or 1.3, or 1.5 to 2.0, or 2.5 or 3.0.

The concave surface 118 is the quadrant arc segment of the elliptical quadrant sector defined by point (A2) on the flat recessed surface, point (B2) on the flat front surface, and point (C2), the origin of second ellipse E2. The concave surface 118 is the quadrant arc segment of the second ellipse E2 between the second endpoint A2 and the point B2.

In an embodiment, the distance between (B2) and (C2) is from is from 0.1 mm, or 0.5 mm, 0.8 mm, or 1.0 mm, or 1.5 mm, 1.6 mm, or 2.0 mm, or 3.0 mm, or 4.0 mm, or 5.0 mm, or 6.0 mm to 7.0 mm, or 8.0 mm, or 9.0 mm, or 10.0 mm, or 11.0 mm, or 12.0 mm. In a further embodiment, the distance between (B1) and (C1) is the same as the value for $x_2$.

2. Seal Bar Apparatus

The seal bar apparatus 300 includes the first seal bar 10 and the second seal bar 210. The first seal bar 10 and the second seal bar 210 have the same, or substantially the same structure, geometry, and construction as previously disclosed. The first seal bar 10 and the second seal bar 210 oppose each other such that the flat front surface 14 of the first seal bar 10 faces the flat front surface 214 of the second seal bar 210 as shown in FIGS. 1-7. The second seal bar 210 is in mirror-image orientation with respect to first seal bar 10. Since the second seal bar 210 has the same structure and geometry as the first seal bar 10, the second seal bar 210 fulfills Equation (1) and Equation (2) and has the same values for d, $x_1/x_2, y_1/y_2$, $R_1/R_2$ as set forth above with respect to the first seal bar 10.

In an embodiment, the distance between (A1) and (A2) is from 14.0 mm, or 15.0 mm, or 16.0 mm, or 16.4 mm, or 16.8 mm to 17.2 mm, or 18.0 mm, or 19.0 mm, or 20.0 mm.

In an embodiment, the distance between (B1) and (B2) is from 18.0 mm, or greater than 18.0 mm, or 18.5 mm, or 18.9 m to 19.0 mm, or 19.5 mm, or 20.0 mm. In a further embodiment, the distance between (B1) and (B2) is 1.12 times the distance between (A1) and (A2) for any of the distances disclosed in the immediately preceding paragraph.

In an embodiment, the distance between (C1) and (C2) is from 17.0 mm, or 17.5 mm, or 17.9 mm to 18.0 mm.

3. Process

The present disclosure provides a process. In an embodiment, the process includes (A) providing the seal bar apparatus 300 with the first seal bar 10 and the second seal bar 210. The process includes (B) providing a fitment with a base, the base comprising an ethylene/α-olefin multi-block copolymer. The process includes (C) placing the base between two opposing multilayer films, each multilayer film having a respective seal layer comprising an olefin-based polymer and forming a film/base/film sandwich. The process includes (D) positioning the film/base/film sandwich between the opposing first seal bar and the second seal bar of seal bar assembly. The process includes (E) sealing the base to each multilayer film with opposing heated seal bars.

4. Fitment

Figure 8:
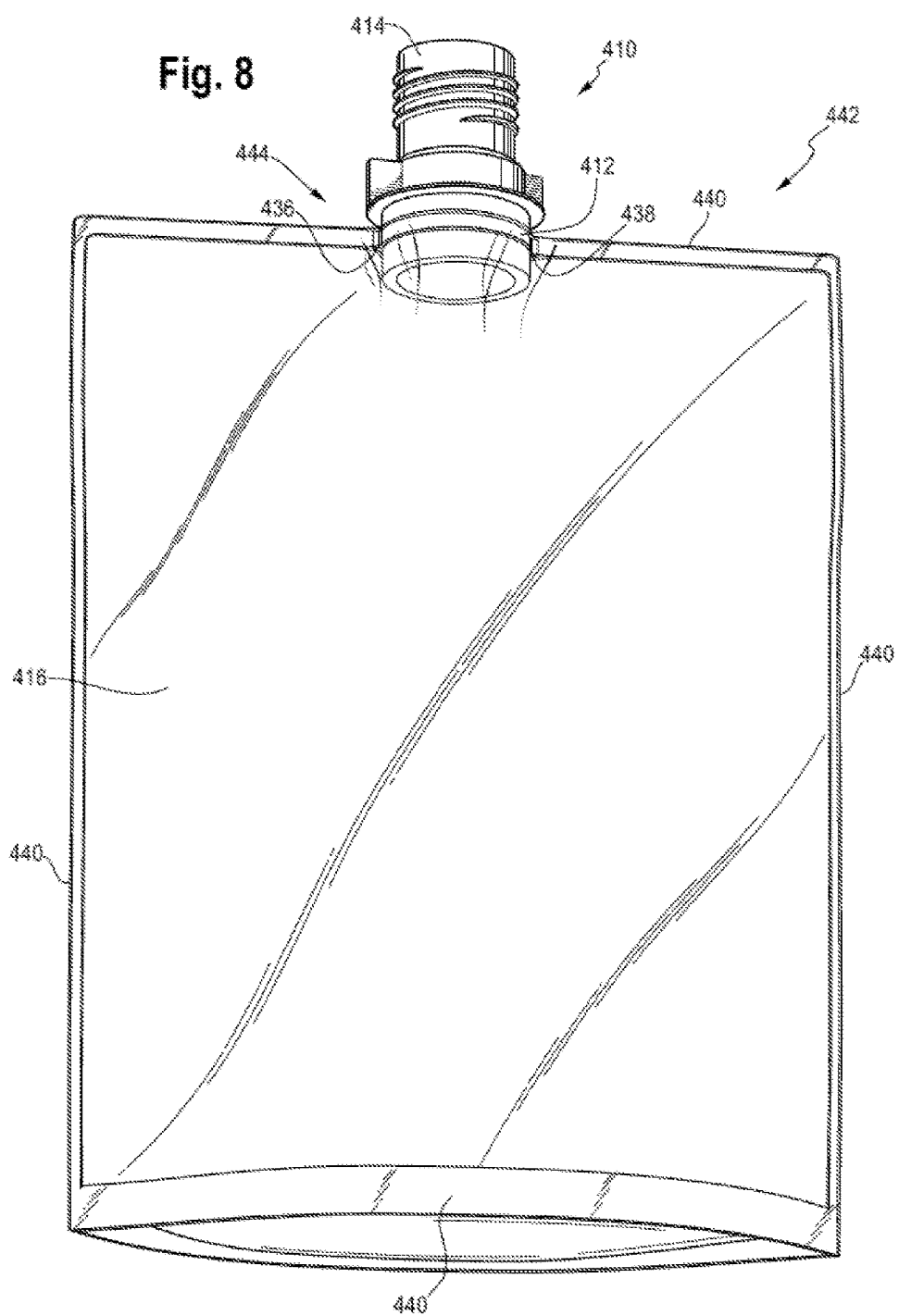
FIG. 8 is a perspective view of a flexible container in accordance with an embodiment of the present disclosure.

A fitment 410 has a base 412 and a top 414 as shown in FIG. 8. The fitment 410 is composed of an ethylene/α-olefin multi-block copolymer. The ethylene/α-olefin multi-block copolymer may be the sole polymeric component of the fitment 410. Alternatively, the ethylene/α-olefin multi-block copolymer may be blended with one or more other polymeric materials. In an embodiment, the base 412 is made from a polymeric blend composed of an ethylene/α-olefin multi-block copolymer and a high density polyethylene. The top 414 may include suitable structure (such as threads, for example) for attachment with a closure.

In an embodiment, the fitment is a tube member. A "tube member" is an elongated hollow cylinder for transporting a flowable material.

In an embodiment, the base is only composed of, or is otherwise formed solely from, the blend of ethylene/α-olefin multi-block copolymer and high density polyethylene.

In an embodiment the entire fitment 410 (the base 412 and the top 414) is only composed of, or is otherwise solely formed from, the polymeric blend of ethylene/α-olefin multi-block copolymer and the high density polyethylene.

Figure 4:
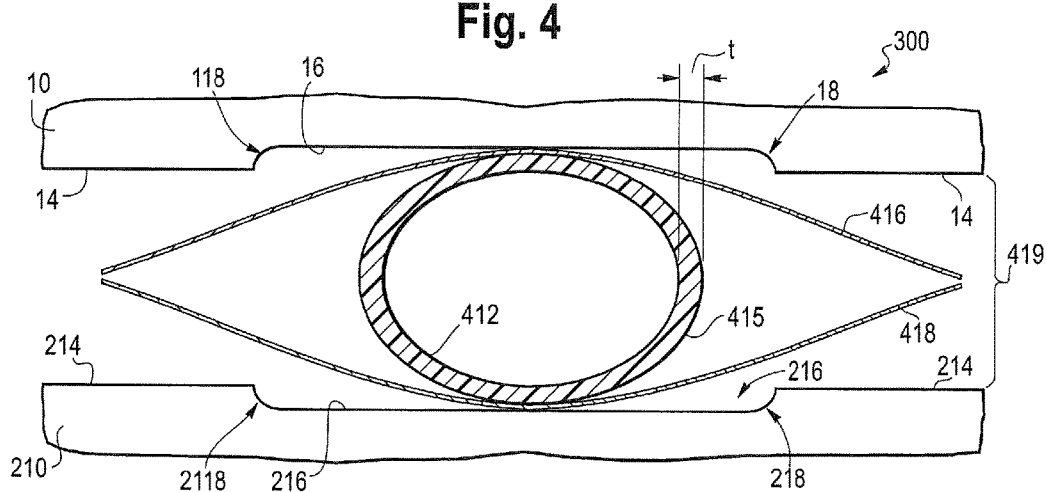
FIG. 4 is an elevation view of a heat sealing procedure whereby a film/base/film sandwich is disposed between the opposing heat seal bars, in accordance with an embodiment of the present disclosure.

In an embodiment, the base has a wall 415, as shown in FIG. 4. The wall 415 has a thickness, t, from 0.3 mm, or 0.4 mm, or 0.5 mm, or 0.6 mm, or 0.7 mm, or 0.8 mm, or 0.9 mm, or 1.0 mm to 1.2 mm, or 1.5 mm, or 1.7 mm, or 1.9 mm, or 2.0 mm. In a further embodiment, the wall 415 is solely composed of the polymeric blend of ethylene/α-olefin multi-block copolymer and the high density polyethylene and has the foregoing thickness.

The base 412 (and optionally the entire fitment 410) is formed from the polymeric blend of ethylene/α-olefin multi-block copolymer and high density polyethylene. The term "ethylene/α-olefin multi-block copolymer" includes ethylene and one or more copolymerizable α-olefin comonomer in polymerized form, characterized by multiple blocks or segments of two or more polymerized monomer units differing in chemical or physical properties. The term "ethylene/α-olefin multi-block copolymer" includes block copolymer with two blocks (di-block) and more than two blocks (multi-block). The terms "interpolymer" and "copolymer" are used interchangeably herein. When referring to amounts of "ethylene" or "comonomer" in the copolymer, it is understood that this means polymerized units thereof. In some embodiments, the ethylene/α-olefin multi-block copolymer can be represented by the following formula:

$(AB)_n$

Where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows:

$AAA\text{-}AA\text{-}BBB\text{-}BB$

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole block copolymer, i.e., ethylene comprises at least 50 mole percent of the whole polymer. More preferably ethylene comprises at least 60 mole percent, at least 70 mole percent, or at least 80 mole percent, with the substantial remainder of the whole polymer comprising at least one other comonomer that is preferably an α-olefin having 3 or more carbon atoms. In some embodiments, the ethylene/α-olefin multi-block copolymer may comprise 50 mol % to 90 mol % ethylene, or 60 mol % to 85 mol %, or 65 mol % to 80 mol %. For many ethylene/octene multi-block copolymers, the composition comprises an ethylene content greater than 80 mole percent of the whole polymer and an octene content of from 10 to 15, or from 15 to 20 mole percent of the whole polymer.

The ethylene/α-olefin multi-block copolymer includes various amounts of "hard" segments and "soft" segments. "Hard" segments are blocks of polymerized units in which ethylene is present in an amount greater than 90 weight percent, or 95 weight percent, or greater than 95 weight percent, or greater than 98 weight percent based on the weight of the polymer, up to 100 weight percent. In other words, the comonomer content (content of monomers other than ethylene) in the hard segments is less than 10 weight percent, or 5 weight percent, or less than 5 weight percent, or less than 2 weight percent based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 weight percent, or greater than 8 weight percent, greater than 10 weight percent, or greater than 15 weight percent based on the weight of the polymer. In some embodiments, the comonomer content in the soft segments can be greater than 20 weight percent, greater than 25 weight percent, greater than 30 weight percent, greater than 35 weight percent, greater than 40 weight percent, greater than 45 weight percent, greater than 50 weight percent, or greater than 60 weight percent and can be up to 100 weight percent.

The soft segments can be present in an ethylene/α-olefin multi-block copolymer from 1 weight percent to 99 weight percent of the total weight of the ethylene/α-olefin multi-block copolymer, or from 5 weight percent to 95 weight percent, from 10 weight percent to 90 weight percent, from 15 weight percent to 85 weight percent, from 20 weight percent to 80 weight percent, from 25 weight percent to 75 weight percent, from 30 weight percent to 70 weight percent, from 35 weight percent to 65 weight percent, from 40 weight percent to 60 weight percent, or from 45 weight percent to 55 weight percent of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Interpolymers," filed on Mar. 15, 2006, in the name of Colin L. P. Shan, Lonnie Hazlitt, et al. and assigned to Dow Global Technologies Inc., the disclosure of which is incorporated by reference herein in its entirety. In particular, hard segment and soft segment weight percentages and comonomer content may be determined as described in Column 57 to Column 63 of U.S. Pat. No. 7,608,668.

The ethylene/α-olefin multi-block copolymer is a polymer comprising two or more chemically distinct regions or segments (referred to as "blocks") preferably joined (or covalently bonded) in a linear manner, that is, a polymer comprising chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, the ethylene multi-block interpolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299(\Delta H) + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ or}$$

(D) has a molecular weight fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; or (E) has a storage modulus at 25° C., G'(25° C.), and a storage modulus at 100° C., G'(100° C.), wherein the ratio of G'(25° C.) to G'(100° C.) is in the range of about 1:1 to about 9:1.

The ethylene/α-olefin multi-block copolymer may also have:

(F) molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (G) average block index greater than zero and up to about 1.0 and a molecular weight distribution, Mw/Mn greater than about 1.3.

Suitable monomers for use in preparing the present ethylene/α-olefin multi-block copolymer include ethylene and one or more addition polymerizable monomers other than ethylene. Examples of suitable comonomers include straight-chain or branched α-olefins of 3 to 30, or 3 to 20, or 4 to 8 carbon atoms, such as propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; cyclo-olefins of 3 to 30, or 3 to 20, carbon atoms, such as cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene; di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidenenorbornene, vinyl norbornene, dicyclopentadiene, 7-methyl-1,6-octadiene, 4-ethylidene-8-methyl-1,7-nonadiene, and 5,9-dimethyl-1,4,8-decatriene; and 3-phenylpropene, 4-phenylpropene, 1,2-difluoroethylene, tetrafluoroethylene, and 3,3,3-trifluoro-1-propene.

In an embodiment, the ethylene/α-olefin multi-block copolymer is void of styrene (i.e., is styrene-free).

The ethylene/α-olefin multi-block copolymer can be produced via a chain shuttling process such as described in U.S. Pat. No. 7,858,706, which is herein incorporated by reference. In particular, suitable chain shuttling agents and related information are listed in Col. 16, line 39 through Col. 19, line 44. Suitable catalysts are described in Col. 19, line 45 through Col. 46, line 19 and suitable co-catalysts in Col. 46, line 20 through Col. 51 line 28. The process is described throughout the document, but particularly in Col. Col 51, line 29 through Col. 54, line 56. The process is also described, for example, in the following: U.S. Pat. No. 7,608,668; U.S. Pat. No. 7,893,166; and U.S. Pat. No. 7,947,793.

In an embodiment, the ethylene/α-olefin multi-block copolymer has hard segments and soft segments, is styrene-free, consists of only (i) ethylene and (ii) a $C_4$-$C_8$ α-olefin comonomer, and is defined as having:

a Mw/Mn from 1.7 to 3.5, at least one melting point, Tm, in degrees Celsius, and a density, d, in grams/cubic centimeter, where in the numerical values of Tm and d correspond to the relationship:

$$Tm < -2002.9 + 4538.5(d) - 2422.2(d)^2,$$

where d is from 0.86 g/cc, or 0.87 g/cc, or 0.88 g/cc to 0.89 g/cc;

and

Tm is from 80° C., or 85° C., or 90° C. to 95, or 99° C., or 100° C., or 105° C. to 110° C., or 115° C., or 120° C., or 125° C.

In an embodiment, the ethylene/α-olefin multi-block copolymer is an ethylene/octene multi-block copolymer (consisting only of ethylene and octene comonomer) and has one, some, any combination of, or all the properties (i)-(ix) below:

(i) a melt temperature (Tm) from 80° C., or 85° C., or 90° C. to 95, or 99° C., or 100° C., or 105° C. to 110° C., or 115° C., or 120° C., or 125° C.;

(ii) a density from 0.86 g/cc, or 0.87 g/cc, or 0.88 g/cc to 0.89 g/cc;

(iii) 50-85 wt % soft segment and 40-15 wt % hard segment;

(iv) from 10 mol %, or 13 mol %, or 14 mol %, or 15 mol % to 16 mol %, or 17 mol %, or 18 mol %, or 19 mol %, or 20 mol % octene in the soft segment;

(v) from 0.5 mol %, or 1.0 mol %, or 2.0 mol %, or 3.0 mol % to 4.0 mol %, or 5 mol %, or 6 mol %, or 7 mol %, or 9 mol % octene in the hard segment;

(vi) a melt index (MI) from 1 g/10 min, or 2 g/10 min, or 5 g/10 min, or 7 g/10 min to 10 g/10 min, or 15 g/10 min to 20 g/10 min;

(vii) a Shore A hardness from 65, or 70, or 71, or 72 to 73, or 74, or 75, or 77, or 79, of 80;

(viii) an elastic recovery (Re) from 50%, or 60% to 70%, or 80%, or 90%, at 300% 300% $\text{min}^{-1}$ deformation rate at 21° C. as measured in accordance with ASTM D 1708.

(ix) a polydisperse distribution of blocks and a polydisperse distribution of block sizes.

In an embodiment, the ethylene/α-olefin multi-block copolymer is an ethylene/octene multi-block copolymer.

The present ethylene/α-olefin multi-block copolymer may comprise two or more embodiments disclosed herein.

In an embodiment, the ethylene/octene multi-block copolymer is sold under the Tradename INFUSE™ is available from The Dow Chemical Company, Midland, Mich., USA. In a further embodiment, the ethylene/octene multi-block copolymer is INFUSE™ 9817.

In an embodiment, the ethylene/octene multi-block copolymer is INFUSE™ 9500.

In an embodiment, the ethylene/octene multi-block copolymer is INFUSE™ 9507.

5. High Density Polyethylene

The base 412 (and optionally the entire fitment 410) is composed of a polymeric blend of the ethylene/α-olefin multi-block copolymer and a high density polyethylene. A "high density polyethylene" (or "HDPE") is an ethylene homopolymer or an ethylene/α-olefin copolymer with at least one $C_3$-$C_{10}$ α-olefin comonomer, and has a density from greater than 0.940 g/cc, or 0.945 g/cc, or 0.950 g/cc, or 0.955 g/cc to 0.960 g/cc, or 0.965 g/cc, or 0.970 g/cc, or 0.975 g/cc, or 0.980 g/cc. Nonlimiting examples of suitable comonomers include propylene, 1-butene, 1 pentene, 4-methyl-1-pentene, 1-hexene, and 1-octene. The HDPE includes at least 50 percent by weight units derived from ethylene, i.e., polymerized ethylene, or at least 70 percent by weight, or at least 80 percent by weight, or at least 85 percent by weight, or at least 90 weight percent, or at least 95 percent by weight ethylene in polymerized form. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks.

In an embodiment, the HDPE has one, some, or all of the following properties: and has one, some, any combination of, or all the properties (i)-(iv) below:

(i) a density from 0.945 g/cc, or 0.950 g/cc, or 0.955 g/cc, or 0.960 g/cc to 0.965 g/cc, or 0.970 g/cc, or 0.975 g/cc, or 0.980 g/cc; and/or (ii) a melt index (MI) from 0.5 g/10 min, or 1.0 g/10 min, or 1.5 g/10 min, or 2.0 g/10 min to 2.5 g/10 min, or 3.0 g/10 min, or 5.0 g/10 min, or 10.0 g/10 min, or 15.0 g/10 min, or 20.0 g/10 min, or 25.0 g/10 min, or 30.0 g/10 min, or 35.0 g/10 min; and/or (iii) a melt temperature (Tm) from 125° C., or 128° C., or 130° C. to 132° C., or 135° C., or 137° C.; and/or (iv) a bimodal molecular weight distribution.

In an embodiment, the HDPE has a density from 0.955 g/cc, or 0.957 g/cc, or 0.959 g/cc to 0.960 g/cc, or 0.963 g/cc, or 0.965 g/cc and has a melt index from 1.0 g/10 min, or 1.5 g/10 min, or 2.0 g/10 min to 2.5 g/10 min, or 3.0 g/10 min.

Nonlimiting examples of suitable, commercially available HDPE include, but are not limited to, Dow High Density Polyethylene resins sold under the trade names CONTINUUM™ and UNIVAL™.

HDPE is distinct from each of the following types of ethylene-based polymer: linear low density polyethylene (LLDPE), metallocene-LLDPE (m-LLDPE), ultra low density polyethylene (ULDPE), very low density polyethylene (VLDPE), multi-component ethylene-based copolymer (EPE), ethylene/α-olefin multi-block copolymer, ethylene plastomers/elastomers, and low density (LDPE), as each polymer is defined in co-pending application U.S. Ser. No. 15/275,842 filed on Sep. 26, 2016, incorporated by reference herein in its entirety.

The base 412 and/or the entire fitment 410 is composed of the ethylene/α-olefin multi-block copolymer/HDPE polymeric blend. The polymeric blend of ethylene/α-olefin multi-block copolymer and HDPE includes from 60 wt %, or 65 wt %, or 70 wt %, or 75 wt % to 80 wt %, or 85 wt %, or 90 wt % of the ethylene/α-olefin multi-block copolymer and a reciprocal amount of HDPE or from 40 wt %, or 35 wt %, or 30 wt %, or 25 wt % to 20 wt %, or 15 wt %, or 10 wt % HDPE.

In an embodiment, the entire fitment is composed of only the ethylene/α-olefin multi-block copolymer and HDPE polymeric blend which includes from 70 wt %, or 73 wt %, or 75 wt % to 78 wt %, or 80 wt %, or 83 wt %, or 85 wt %, or 87 wt %, or 90 wt % of the ethylene/α-olefin multi-block copolymer and a reciprocal amount of HDPE or from 30 wt %, or 27 wt %, or 25 wt % to 22 wt %, or 20 wt %, or 17 wt %, or 15 wt %, or 13 wt %, or 10 wt % of the HDPE.

6. Multilayer Films

The process includes placing the base 412 between two opposing multilayer films 416, 418 to form a film/base/film sandwich 419, as shown in FIG. 4.

The fitment base 412 is placed between two opposing multilayer films and subsequently sealed thereto. Each multilayer film 416, 418 has a respective seal layer containing an olefin-based polymer.

In an embodiment, each multilayer film 416, 418 is made from a flexible film having at least one, or at least two, or at least three layers. The flexible film is resilient, flexible, deformable, and pliable. The structure and composition for each flexible film 416, 418 may be the same or may be different. For example, each multilayer film 416, 418 can be made from a separate web, each web having a unique structure and/or unique composition, finish, or print. Alternatively, each multilayer film 416, 418 can be the same structure and the same composition.

The flexible multilayer film is composed of a polymeric material. Nonlimiting examples of suitable polymeric material include olefin-based polymer; propylene-based polymer; ethylene-based polymer; polyamide (such as nylon), ethylene-acrylic acid or ethylene-methacrylic acid and their ionomers with zinc, sodium, lithium, potassium, or magnesium salts; ethylene vinyl acetate (EVA) copolymers; and blends thereof. The flexible multilayer film can be either printable or compatible to receive a pressure sensitive label or other type of label for displaying of indicia on the flexible container 442.

In an embodiment, a flexible multilayer film is provided and includes at least three layers: (i) an outermost layer, (ii) one or more core layers, and (iii) an innermost seal layer. The outermost layer (i) and the innermost seal layer (iii) are surface layers with the one or more core layers (ii) sandwiched between the surface layers. The outermost layer may include (a-i) a HDPE, (b-ii) a propylene-based polymer, or combinations of (a-i) and (b-ii), alone, or with other olefin-based polymers such as LDPE. Nonlimiting examples of suitable propylene-based polymers include propylene homopolymer, random propylene/α-olefin copolymer (majority amount propylene with less than 10 weight percent ethylene comonomer), and propylene impact copolymer (heterophasic propylene/ethylene copolymer rubber phase dispersed in a matrix phase).

With the one or more core layers (ii), the number of total layers in the present multilayer film (416, 418) can be from three layers (one core layer), or four layers (two core layers), or five layers (three core layers, or six layers (four core layers), or seven layers (five core layers) to eight layers (six core layers), or nine layers (seven core layers), or ten layers (eight core layers), or eleven layers (nine core layers), or more.

Each multilayer film 416, 418 has a thickness from 75 microns, or 100 microns, or 125 microns, or 150 microns to 200 microns, or 250 microns or 300 microns or 350 microns, or 400 microns.

In an embodiment, each multilayer film 416, 418 a flexible multilayer film having the same structure and the same composition.

The flexible multilayer film 416, 418 may be (i) a coextruded multilayer structure or (ii) a laminate, or (iii) a combination of (i) and (ii). In an embodiment, the flexible multilayer film has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and/or optical properties.

In an embodiment, the outermost layer includes a HDPE. In a further embodiment, the HDPE is a substantially linear multi-component ethylene-based copolymer (EPE) such as ELITE™ resin provided by The Dow Chemical Company.

In an embodiment, each core layer includes one or more linear or substantially linear ethylene-based polymers or block copolymers having a density from 0.908 g/cc, or 0.912 g/cc, or 0.92 g/cc, or 0.921 g/cc to 0.925 g/cc, or less than 0.93 g/cc. In an embodiment, each of the one or more core layers includes one or more ethylene/$C_3$-$C_8$ α-olefin copolymers selected from linear low density polyethylene (LLDPE), ultralow density polyethylene (ULDPE), very low density polyethylene (VLDPE), EPE, olefin block copolymer (OBC), plastomers/elastomers, and single-site catalyzed linear low density polyethylenes (m-LLDPE).

In an embodiment, the seal layer includes one or more ethylene-based polymers having a density from 0.86 g/cc, or 0.87 g/cc, or 0.875 g/cc, or 0.88 g/cc, or 0.89 g/cc to 0.90 g/cc, or 0.902 g/cc, or 0.91 g/cc, or 0.92 g/cc. In a further embodiment, the seal layer includes one or more ethylene/$C_3$-$C_8$ α-olefin copolymers selected from EPE, plastomers/elastomers, or m-LLDPE.

In an embodiment, the flexible multilayer film is a coextruded film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 g/cm$^3$, or from 0.875 to 0.910 g/cm$^3$, or from 0.888 to 0.900 g/cm$^3$ and the outer layer is composed of a polyamide having a Tm from 170° C. to 270° C.

In an embodiment, the flexible multilayer film is a coextruded and/or laminated film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and a density from 0.865 to 0.925 g/cm$^3$, or from 0.875 to 0.910 g/cm$^3$, or from 0.888 to 0.900 g/cm$^3$ and an outermost layer composed of a material selected from HDPE, EPE, LLDPE, OPET (biaxially oriented polyethylene terephthalate), OPP (oriented polypropylene), BOPP (biaxially oriented polypropylene), polyamide, and combinations thereof.

In an embodiment, the flexible multilayer film is a coextruded and/or laminated film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm$^3$, or from 0.875 to 0.910 g/cm$^3$, or from 0.888 to 0.900 g/cm$^3$. The outer layer is composed of a material selected from HDPE, EPE, LLDPE, OPET, OPP, BOPP, polyamide, and combinations thereof.

In an embodiment, the flexible multilayer film is a coextruded (or laminated) film of three or more layers where all layers consist of ethylene-based polymers. In a further embodiment, the flexible multilayer film is a coextruded (or laminated) film of three or more layers where each layer consists of ethylene-based polymers and (1) the seal layer is composed of a linear or substantially linear ethylene-based polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 g/cm$^3$, or from 0.875 to 0.910 g/cm$^3$, or from 0.888 to 0.900 g/cm$^3$ and (2) the outer layer includes one or more ethylene-based polymers selected from HDPE, EPE, LLDPE or m-LLDPE and (3) each of the one or more core layers includes one or more ethylene/$C_3$-$C_8$ α-olefin copolymers selected from low density polyethylene (LDPE), linear low density polyethylene (LLDPE), ultralow density polyethylene (ULDPE), very low density polyethylene (VLDPE), EPE, olefin block copolymer (OBC), plastomers/elastomers, and single-site catalyzed linear low density polyethylenes (m-LLDPE).

In an embodiment, the flexible multilayer film is a coextruded and/or laminated five layer, or a coextruded (or laminated) seven layer film having at least one layer containing OPET or OPP.

In an embodiment, the flexible multilayer film is a coextruded (or laminated) five layer, or a coextruded (or laminated) seven layer film having at least one layer containing polyamide.

In an embodiment, the flexible multilayer film is a seven-layer coextruded (or laminated) film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 106° C. The outer layer is a polyamide having a Tm from 170° C. to 270° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

7. Sealing

The present process includes positioning the film/base/film sandwich between the opposing seal bars 10, 210 as shown in FIG. 4. The present process includes sealing the base to each multilayer film with opposing heated seal bars. FIG. 4 shows the base 412 located between multilayer film 416 and multilayer film 418. The term "sealing" is the act of compressing the base 412 with opposing seal bars 10, 210 such that opposing interior portions of the base wall 415 contact, or otherwise touch, each other. The base 412 is located, or otherwise is "sandwiched," between multilayer film 416 and the multilayer film 418 to form a film/base/film sandwich 419, as shown in FIG. 4. The film-base-film sandwich 419 is positioned between seal bar 10 and flat seal bar 210. Seal bar 10 opposes seal bar 210, such that the flat front surface 14 of the (first) seal bar 10 opposes the flat front surface 214 of the (second) seal bar 214. The seal bar assembly 300 includes suitable structure and mechanism to move the seal bars 10, 210 toward and away from each other in order to perform a heat sealing procedure as previously disclosed herein. The seal bars 10 and 210 are heated and the process includes sealing the base 412, with the base sandwiched between multilayer film 416 and multilayer film 418. The sealing forms opposing seal joints 424, 426 at the flattened ends 423, 425 of the base 412, as shown in FIGS. 5 and 6.

The sealing step includes adjoining, or otherwise welding, each multilayer film 416, 418 to respective upper portion 413a and a lower portion 413b of the base 412 as shown in FIGS. 5, 5A, 6, and 6A.

In an embodiment, the process includes:

(i) selecting, for the base 412, an ethylene/α-olefin multi-block copolymer having a melt temperature, Tm1, from 115° C. to 125° C.;

(ii) selecting, for the seal layers, an olefin-based polymer having a melt temperature, Tm2, such that Tm2 is from 10° C. to 40° C. less than Tm1.

In an embodiment, Tm2 is from 10° C., or 15° C., or 20° C. to 25° C., or 30° C., or 35° C., or 40° C. less than Tm1.

In an embodiment, each seal layer is formed from an ethylene-based polymer with a Tm2 from 10° C. to 40° C. less than the Tm1 of the ethylene/α-olefin multi-block copolymer in the base 12. The flat seal bars 20, 22 are heated to a temperature greater than or equal to the melt temperature (Tm2) of the seal layer ethylene-based polymer and less than or equal to the melt temperature, Tm1 (or to at least the softening temperature of the ethylene/α-olefin multi-block copolymer), of the base 412. The compression force and heat imparted by the opposing flat bars flat seal bars 10, 210 simultaneously (i) flatten, or otherwise deform, the base 412; (ii) compress the seal layer of each multilayer film 416, 418 against the outer surface of the base 412; (iii) form a seal joint 424 and a seal joint 426 on opposing ends of the flattened base 412; (iv) melt the ethylene-based polymer in the seal layers, (v) soften and/or melt at least some of the ethylene/α-olefin multi-block copolymer present in the base 412, (vi), form a flowable caulk 428 composed of (a) the ethylene/α-olefin multi-block copolymer from the base, (b) the ethylene-based polymer from the seal layers, or (c) a combination of (a) and (b); and (vii) weld upper portion/lower portion 413a, 413b to respective seal layers of films 416, 418.

In an embodiment, the sealing step entails one, some or all of the following seal conditions:

(i) a temperature from 160° C., or 170° C. to 180° C., or 190° C., or 200° C.;

(ii) a pressure (or seal force) from 1 MegaPascals (MPa) to 2 MPa;

(iii) application of (i) and/or (ii) for a duration (seal time or dwell time) from 0.1 seconds, or 0.5 seconds, or 0.75 seconds, or 1.0 second, or 2.0 seconds, or 3.0 seconds, or 4.0 seconds, or 5.0 seconds to 6.0 seconds, or 7.0 seconds, or 0.75 seconds, or 8.0 seconds, or 9.0 seconds or 10 seconds.

The compression force fully collapses the base 412 upon itself, so that opposing flattened sides of the base contact each other, closing the base 412, and giving the base 412 a linear configuration F as shown in FIGS. 5 and 6.

In an embodiment, the compression force and the heating of the closed seal bars 10, 210 forces the flowable caulk 428 to move, or otherwise flow, from the outer surface of the base 412 and into the seal joint 424 and into the seal joint 426. The caulk 428 flows into, and fills (wholly or partially), seal joint 424 and seal joint 426 as shown in FIGS. 5 and 6.

The process includes opening the closed seal bars 10, 210, thereby removing the compression force and removing the heat from the base 412. When the closed seal bars 10, 210 are opened, the elasticity provided by the ethylene/α-olefin multi-block copolymer in the base 412 enables the base 412 to recoil, or otherwise spring back, from the linear, compressed configuration F and return to an open position as shown in FIG. 7. With recoil, the opposing interior portions of the base wall 415 move away from each other and no longer contact each other. The interior of the base 412 is not sealed to itself. With recoil, the base 412 recovers, and opens, to an elliptical cross section shape, or to a circular cross section shape, after the sealing step as shown in FIGS. 4-7.

In an embodiment, the post-flattened base 412 can have either a circular or an elliptical cross-section G as shown in FIG. 7. Applicant discovered that the base 412 composed of the polymeric blend ethylene/α-olefin multi-block copolymer and HDPE and having a wall 415 thickness from 0.3 mm to 2.0 mm enables the base 412 to withstand the compression force without damage such as crazing, cracking or breaking during full collapse, yet advantageously has sufficient elasticity to spring back to an open configuration upon opening of seal bars 10, 210.

The opening of the closed seal bars forms a welded construction 430 as shown in FIG. 7, whereby multilayer film 416 is welded to the base 412 at upper portion 413a, multilayer film 418 is welded to the base 412 at lower portion 413b, and the multilayer films are welded to each other where the seal layers directly contact each other.

The sealing step applies a compressive and pinching force for sufficient duration to enable the caulk 428 to set and solidify, thereby firmly bonding the multilayer films 416, 418 to the base 412 at the seal joints 424, 426. The solidified caulk 428 forms in situ winglets 436, 438 (FIGS. 7, 7A) completely filling respective seal joints 424, 426, and forming a hermetic seal between the base 412 and the multilayer films 416, 418. An "in situ winglet," as used herein, is a structure that is an extension of the base 412, the in situ winglet being the polymeric solidification of a flowable caulk (caulk 428) composed of the ethylene/α-olefin multi-block copolymer (from the base), the caulk created when the base is flattened under heat, the caulk solidified when seal joints between the films and the base are subsequently pinched and closed. The in situ winglets are composed of, or otherwise are formed from, (i) the ethylene/α-olefin multi-block copolymer (from the base 412), or (ii) a blend of the ethylene/α-olefin multi-block copolymer and the olefin-based polymer (from the seal layer). In this way, the sealing step forms winglets in situ, during the point sealing process.

In an embodiment, the process includes forming the winglet 436 and/or the winglet 438 having a length H (FIG. 7A) from 0.5 mm, or 1.0 mm, or 2.0 mm, or 3.0 mm to 4.0 mm, or 5.0 mm.

8. Flexible Container

The process includes forming a flexible container. The opposing multilayer films 416, 418 are superimposed on each other and form a common peripheral edge 440 as shown in FIG. 8. The process includes sealing the multilayer films 416, 418 along the common peripheral edge and forming a flexible container 442. Formation of the seal along the common peripheral edge 440 can occur before, during or after, the flattening step. Formation of the seal along the common peripheral edge can occur before, during, or after the point sealing step. The process forms a hermetic seal 444 between the base 412 and the multilayer films 416 and 418.

The heat and stress of flat bar sealing of fitment to film to make containers is limited. A fitment composed of low elasticity polyolefin (e.g., LDPE, HDPE) crushes, cracks, breaks, and is unusable. A fitment composed of a polyolefin elastomer (e.g., ENGAGE or VERSIFY elastomers) can exhibit deformation, yet does not recover adequately or welds shut. A fitment composed of a crosslinked elastomer (e.g., TPV) may fully recover but does not seal adequately and does not form a hermetic seal. Applicant surprisingly discovered that a fitment composed of the present polymeric blend of ethylene/α-olefin multi-block copolymer and HDPE recovers (recoils), will not seal to itself, and will seal the fitment to the film of the container using heat seal bars.

Nonlimiting examples for seal bar parameters fulfilling Equation (1) and Equation (2) based on fitment wall thickness, t, and values for seal bars 10, 210 are provided as scenarios A, B, and C shown in Table 1 below.

TABLE 1

Geometry of seal bars 10, 210 based on fitment base thickness for scenarios A-C

|  | Scenario A | Scenario B | Scenario C |
|---|---|---|---|
| Fitment wall thickness, t | 0.80 mm | 0.30 mm | 2.00 mm |
| Fitment inside diameter, Di | 12.50 mm | 8.00 mm | 20.00 mm |
| Fitment outside diameter, Do | 14.10 mm | 8.6 mm | 24.00 mm |
| Fitment pressed flat length (2L) minus the 2 elliptical arc segments at the ends of flat recessed surface = π Di/2 | 19.63 mm | 12.56 mm | 31.40 mm |
| Pressed flat length (PFL) = 2L + 2t = π Di/2 + 2t | 21.23 mm | 13.16 mm | 35.40 mm |
| Length of flat recessed surface = 2L1 = 2L* 0.91 (bar is set 0.91 * 2L) | 17.88 mm | 11.44 mm | 28.61 mm |
| distance d (d is set 1.09t) | 0.87 mm | 0.33 mm | 2.18 mm |
| $x_1, x_2$ | 1.05 mm | 0.39 mm | 2.63 mm |
| $y_1, y_2$ (=d) | 0.87 mm | 0.33 mm | 2.2 mm |
| $R_1, R_2$ | 1.21 | 1.21 | 1.21 |
| $R_1 d = x_1, R_2 d = x_2$ | 1.05 mm | 0.39 mm | 2.63 mm |

By way of example, and not limitation, examples of the present disclosure are provided.

EXAMPLES

1. Seal Bars

A seal bar apparatus is used to produce flexible pouches by heat sealing fitments to multilayer films. The seal bar apparatus has opposing seal bars with the structure of seal bars 10, 210 as shown in FIGS. 1-4. Each seal bar fulfills Equation (1) and Equation (2) with the following values shown in Table 2 below.

TABLE 2

|  | Example 1 |
|---|---|
| Fitment wall thickness, t | 0.80 mm |
| Fitment inside diameter, Di | 12.50 mm |
| Fitment outside diameter, Do | 14.10 mm |
| Pressed flat length (2L) minus the 2 half circles at the ends = π Di/2 | 19.63 mm |
| Pressed flat length (PFL) = 2L + 2t = π Di/2 + 2t | 21.23 mm |
| Length of recess = 2L1 = 2L * 0.91 (bar is set 0.91 * 2L) | 17.88 mm |
| distance d (d = 1.09t) | 0.87 mm |
| $y_1, y_2$ | 0.87 mm |
| $x_1, x_2$ | 1.05 mm |

Flexible multilayer films with structures shown in Table 3 below are used in the present examples.

2. Multilayer Films

TABLE 3

Composition of the Flexible Multilayer Film (Film 1) Laminated Multilayer Film

| Material | Description | Density (g/cm³) ASTM D792 | Melt Index (g/10 min) ASTM D1238 | Melting Point (° C.) DSC | Thickness (micrometer) |
|---|---|---|---|---|---|
| LLDPE | Dowlex ™ 2049 | 0.926 | 1 | 121 | 20 |
| HDPE | Elite ™ 5960G | 0.962 | 0.85 | 134 | 20 |
| LLDPE | | 0.916 | 1 | 123 | 19 |
| Adhesive Layer | Polyurethane solvent less adhesive (ex. Morfree 970/CR137) | | | | 2 |
| HDPE | Elite ™ 5960G | 0.962 | 0.85 | 134 | 19 |
| HDPE | Elite ™ 5960G | 0.962 | 0.85 | 134 | 20 |
| Seal Layer | Affinity ™ 1146 | 0.899 | 1 | 95 | 20 |
| | Total | | | | 120 |

3. Fitments

Nine comparative samples (CS) and four inventive examples (IE) of fitments are prepared. The dimensions for each fitment are identical, with only the material varying across the fitments. The CS fitments are composed of 100 wt % INFUSE 9817. The inventive fitments are composed of 70 wt % INFUSE 9817 and 30 wt % DMDC-1250 NT 7 HDPE. Each fitment has a base wall with a thickness (thickness t) of 0.8 mm and a base inside diameter of 12.5 mm. The base has an outside diameter of 14.1 mm as presented in Table 2 above.

The material and composition for fitments are shown in Table 4 below.

TABLE 4

Materials for Fitments

| Material | Description | Properties | Source |
|---|---|---|---|
| INFUSE 9817 | Ethylene/octene multi-block copolymer | Density: 0.877 g/cc<br>Melting Point: 120° C.<br>Melt Index: 15 g/10 min (2.16 kg @ 190° C.) | The Dow Chemical Company |
| Continuum DMDC-1250 NT 7 | High density polyethylene Ethylene/hexene copolymer, with less than 0.2 wt % hexane | Density: 0.955 g/cm₃<br>Melting Point: 130° C.<br>Melt Index: 1.5 g/10 min (2.16 kg @ 190° C.) | The Dow Chemical Company |

4. Processing Conditions

Each fitment is placed between two opposing films of Film 1 (from Table 3), with seal layers facing each other to form a film/base/film sandwich as shown in FIG. 4.

Each film/base/film sandwich is subjected to a heat sealing procedure using a seal bar apparatus as depicted by seal bar apparatus 300 (with opposing seal bars 10, 210). The heat seal conditions are provided in Table 5 below.

TABLE 5

Heat sealing for installing the fitments composed of 90 wt % ethylene/octene multi-block copolymer and 10 wt % HDPE Concave Seal bar process conditions
Equipment: Sommer Automatic Sealer GP 260
Description: Opposing seal bars with concave curved surface and independent temperature control and force distribution.
Seal pressure                                                                   1-2 MPa

TABLE 5-continued

Heat sealing for installing the fitments composed of 90 wt % ethylene/octene multi-block copolymer and 10 wt % HDPE Seal bar (10) temperature:       194° C.
Seal bar (210) temperature:      194° C.
Seal time:                       1.2 seconds The heat sealing procedure produces flexible containers that are stand-up pouches (SUPs) as shown in FIG. 8.

5. Leak Test

The Lippke test evaluates additional seal integrity for the SUPs. The Lippke test perforates the flexible container with a needle and air pressurized to 150 mbar according to the conditions as described in Table 6 below. After 60 seconds, the pressure gap is registered. If the flexible container has no failure, the pressure will remain the same. The flexible container sample is submerged into a water tank so that air bubbles can be observed coming out of fissure or failure where it exists. The Lippke test determines whether the failure comes from the triple sealing point or from different sources such as poor fitment-closure junction.

Leak test for the flexible containers is performed under the following parameters.

TABLE 6

Lippke Test Procedure

| Analysis | Analysis Description |
|---|---|
| Leak Test | Leak test using Lippke 4500 |
| Equipment condition (Lippke 4500) | |

| Parameter | Value | Unit |
|---|---|---|
| Test pressure | 150 | mbar |
| Setting time | 10 | sec |
| Test time | 60 | sec |
| Limit | 50 | mbar |
| Package Volume [ml] 200 | 200 | ml |

The flexible container is subjected to an internal pressure of 150 mbar. The test entails waiting 10 seconds for settling. The pressure drop is measured for 60 seconds. The flexible container is then submerged in water and the spout/cap junction is observed to monitor whether bubble formation occurs. Higher values for pressure drop indicate a higher leak in the package.

TABLE 7

Lippke Test Results of SUPs

| Sample | Pressure drop after 60 sec (mbar) | Note |
|---|---|---|
| CS 1 | 20.6 | High leak in the spout/cap junction |
| CS 2 | 146.7 | Complete leak in the spout/cap |
| CS 3 | 46.9 | High leak in the spout/cap junction |
| CS 4 | 46.1 | High leak in the spout/cap junction |
| CS 5 | 60.1 | High leak in the spout/cap junction |
| CS 6 | 9.1 | High leak in the spout/cap junction |
| CS 7 | 146.6 | Complete leak in the spout/cap |
| CS 8 | 18.6 | High leak in the spout/cap junction |
| CS 9 | 64.2 | High leak in the spout/cap junction |
| IE 1 | 4.6 | No visual leak in the spout/cap junction |
| IE 2 | 4.6 | No visual leak in the spout/cap junction |
| IE 3 | 5.5 | No visual leak in the spout/cap junction |
| IE 4 | 4.6 | No visual leak in the spout/cap junction |

Test pressure is 150 mbar for all samples in Table 7.

Applicant discovered that the unique structure and geometry of the present seal bars 10, 210 alone, or in combination with fitment composed of the ethylene/α-olefin multi-block copolymer/HDPE blend forms hermetic film-to-fitment seals and hermetic film-to-film seals with little-to-no deformation of the fitment top. The present process yields improved fitment-to-cap sealing as evidenced by the lower pressure drop for IE 1-4 compared to higher pressure drop for CS 1-9. The elliptical curvature of the concave surfaces for the present seal bars provides sufficient winglet formation for hermetic seals to be made while also providing greater recoil and recovery of the fitment, enabling the fitment to revert back to a circular cross-sectional shape post-heat sealing, i.e., with low distortion of the fitment due to sealing.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A seal bar comprising:
a base member having a flat front surface and a flat recessed surface a distance (d) behind the front surface, the front surface defining an x-axis, X;
the flat recessed surface having a first endpoint (A1), wherein an axis that is perpendicular to the flat recessed surface at the first endpoint (A1) defines a first y-axis (Y1);
a concave surface extending the distance (d) between the first endpoint (A1) and a point (B1) on the flat front surface, the concave surface defining a quadrant arc segment of an ellipse between the first endpoint (A1) and the point (B1).

2. The seal bar of claim 1 wherein the concave surface defines a quadrant arc segment of an ellipse defined by Equation (1)

$$\frac{x_1^2}{(R_1 d)^2} + \frac{y_1^2}{(d)^2} = 1, \qquad \text{Equation (1)}$$

wherein
a center of the ellipse (C1) is the intersection of the x-axis (X) and the first y-axis, (Y1);
d is from 0.3 mm to 2.0 mm;
$x_1$ is the ellipse semi-major axis having a length from 0.1 mm to 12.0 mm;
$y_1$ is the ellipse semi-minor axis having the length (d); and
$R_1$ is the ratio of the semi-major axis ($x_1$) divided by the semi-minor axis ($y_1$) and $R_1$ is from 0.6 to 3.0.

3. The seal bar of claim 2 wherein the flat recessed surface comprises a second endpoint (A2) on an end opposite of the first endpoint (A1);
an axis that is perpendicular to the flat recessed surface at the second endpoint (A2) defining a second y-axis (Y2);
a second concave surface extending the distance (d) between the second endpoint (A2) and a point (B2) on the flat front surface, the second concave surface defining a second quadrant arc segment of a second ellipse between the second endpoint (A2) and the point (B2).

4. The seal bar of claim 3 wherein the second concave surface defines a second quadrant arc segment of the second ellipse defined by Equation (2)

$$\frac{x_2^2}{(R_2 d)^2} + \frac{y_2^2}{(d)^2} = 1, \qquad \text{Equation (2)}$$

wherein
a center of the second ellipse (C2) is the intersection of the x-axis (X) and the second y-axis, (Y1);
d is from 0.3 mm to 2.0 mm;
$x_2$ is the second ellipse semi-major axis having a length from 0.1 mm to 12.0 mm;
$y_2$ is the second ellipse semi-minor axis having the length (d); and
$R_2$ is the ratio of the semi-major axis ($x_1$) divided by the semi-minor axis ($y_1$) and $R_1$ is from 0.6 to 3.0.

5. The seal bar of claim 4 wherein the recessed surface has a length from 14.0 mm to 20.0 mm.

6. A seal bar apparatus comprising
a first seal bar of claim 4;
a second seal bar of claim 4;
the first seal bar and the second seal bar oppose each other; and
the flat front surface of the first seal bar faces the flat front surface of the second seal bar.

7. The seal bar apparatus of claim 6 comprising
a fitment with a base;
the fitment located between two opposing multilayer films and forming a film/base/film sandwich; and
the film/base/film sandwich is located between the first seal bar and the second seal bar.

8. A process comprising:
A. providing the seal bar apparatus of claim 6;
B. providing a fitment with a base, the base comprising an ethylene/α-olefin multi-block copolymer;
C. placing the base between two opposing multilayer films, each multilayer film having a respective seal layer comprising an olefin-based polymer and forming a film/base/film sandwich;
D. positioning the film/base/film sandwich between the opposing first seal bar and the second seal bar of claim 6; and
E. sealing the base to each multilayer film with opposing heated seal bars.

\* \* \* \* \*